Nov. 17, 1953
H. J. RAND
2,659,388
VALVE WITH TURBULENT FLOW
Filed Feb. 12, 1949
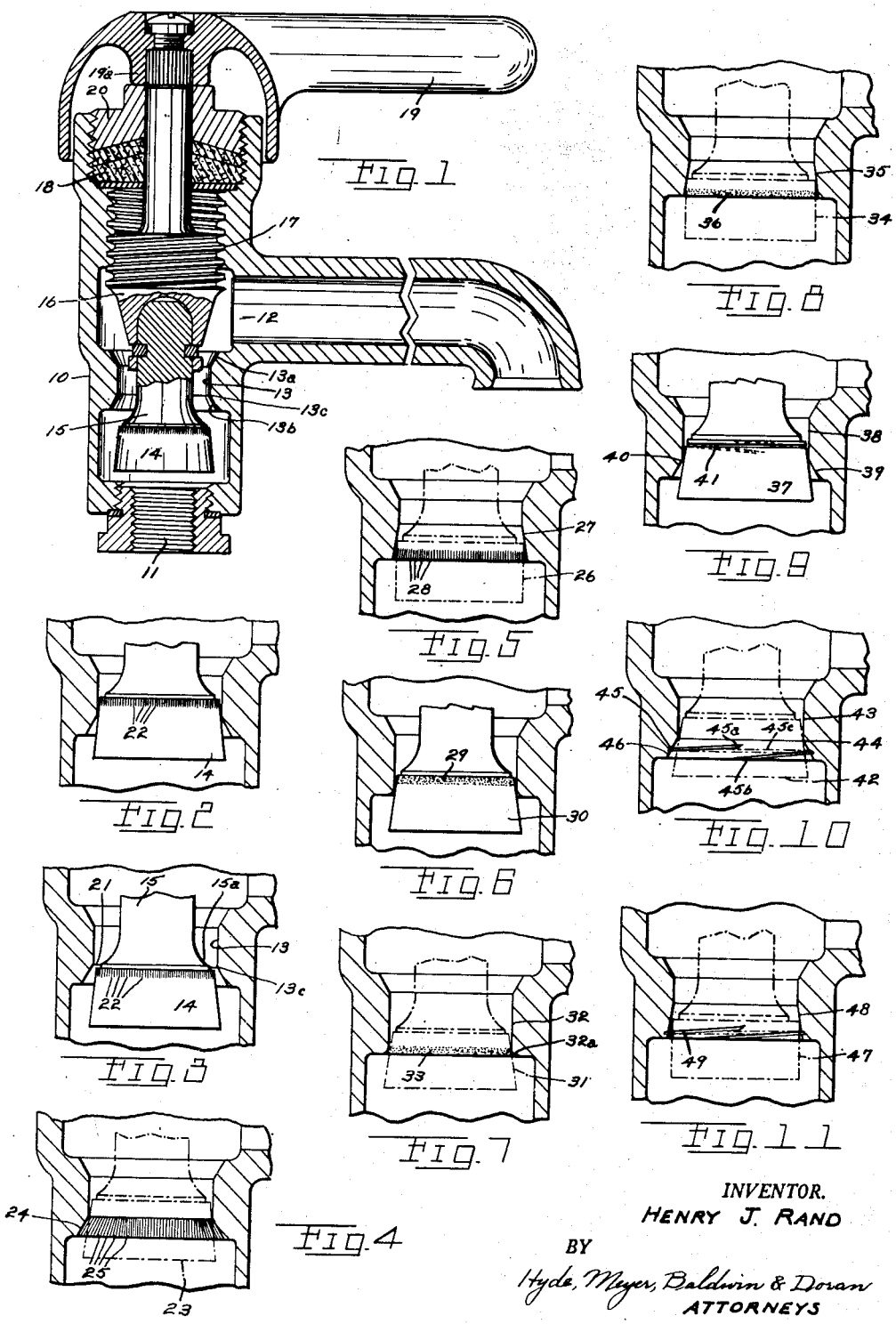
INVENTOR.
HENRY J. RAND
BY
Hyde, Meyer, Baldwin & Doran
ATTORNEYS Patented Nov. 17, 1953

2,659,388

UNITED STATES PATENT OFFICE 2,659,388

VALVE WITH TURBULENT FLOW

Henry J. Rand, Bratenahl, Ohio, assignor to Magic Seal, Inc., Bratenahl, Ohio, a corporation of Ohio Application February 12, 1949, Serial No. 76,073

4 Claims. (Cl. 137—711)

This invention relates to improvements in a valve of the type wherein a plug moves downstream into a generally cylindrical bore to close the valve with a feather touch and in a dripproof manner.

One of the objects of the present invention is to provide turbulent flow of the fluid at the zone where the plug approaches the bore with a sealing action so as to prevent singing or chattering of the valve.

Another object of the present invention is to provide turbulent flow of the fluid by means of roughened surfaces on the plug itself.

Still another feature of the present invention is the provision of turbulent flow by providing roughened surfaces on the valve bore in a novel manner and at a certain zone.

Other objects and advantages of the present invention will be apparent from the accompanying drawings and description and the essential features will be set forth in the appended claims.

In the drawings,

Fig. 1 is a central sectional view through a faucet type of valve embodying my invention;

Fig. 2 is a fragmental sectional view of a portion of Fig. 1 enlarged and showing the valve in closed position;

Fig. 3 is a view similar to Fig. 2 but showing the valve in almost closed position;

Fig. 4 is a view similar to Fig. 2 showing a modification wherein the scratches or score marks are on the bore of the valve housing rather than on the plug itself as in Fig. 2;

Fig. 5 is a view similar to Fig. 4 showing a modification wherein a generally cylindrical plug provides a line contact with a tapering wall of the valve bore and the turbulence producing score marks are produced on the valve housing itself;

Fig. 6 is a view similar to Fig. 2 showing a modification wherein the roughening surface on the valve plug is of the nature of a pitting or sand blasting;

Fig. 7 is a view similar to Fig. 6 but a modification in which the pitting or sand blasting is applied to the valve housing or bore rather than to the valve plug;

Fig. 8 is a view similar to Fig. 7 but showing a modification wherein a generally cylindrical plug seals in a tapering bore and the turbulence producing rough surface is on the valve bore itself;

Fig. 9 is a view similar to Fig. 2 but showing a modification wherein the roughening at the upper portion of the valve plug is provided by means of a spiral groove;

Fig. 10 is a view similar to Fig. 9 but showing a modification wherein the spiral turbulence producing groove is in the valve body itself rather than in the valve plug; while Fig. 11 is a view similar to Fig. 10 showing a modification wherein a generally cylindrical valve plug seats in a tapering bore and the turbulence producing roughening of the valve bore comprises a spiral groove.

My invention is applicable to valves of various types but I have chosen to show the same as applied to a faucet of well known character and particularly to a faucet embodying my invention set forth in my copending application, Serial No. 71,092 filed January 15, 1949, to which reference may be had for a more complete description.

The valve housing 10 is provided with a fluid inlet 11 and a fluid outlet 12. Intermediate the inlet and outlet, there is provided a generally cylindrical bore 13. A resilient plug of rubber-like material 14 is mounted on a stem portion 15 for movement in and out of the bore 13. The plug 14 has an uppermost diameter which is equal to or slightly less than the diameter of the bore 13. The plug then flares downwardly and outwardly in truncated cone form and has a base diameter at the bottom which is preferably slightly larger than the diameter of the bore 13. With this construction of the plug 14, it may be compressed sufficiently to pass downwardly through the bore 13 when the valve is being assembled. To this end, the upper end of the bore is flared as indicated at 13a to cam the sides of the plug inwardly as it is passed downwardly to operative position. The lower end of the bore is flared outwardly at 13b to provide a good sealing action at the shoulder 13c when the plug is pulled up into sealing position as indicated in Fig. 2. This gives an annular line contact for sealing which closes the valve with a feather touch in a dripproof manner, which reduces the wear on the valve very greatly, and which affords a good closing action whether the controlled fluid is clean or dirty. There is a wiping action of the plug as it moves into sealing position which wipes away any dirt and produces a clean seal.

The stem portion 15 is mounted in the main stem 16 to move axially therewith but to rotate relatively thereto about the central pivotal axis. The details of this mounting are shown in my above mentioned copending application. The usual threads 17 provide cooperation between the stem and the valve housing to cause axial movement of the valve stem when the stem is rotated. The upper end of the stem is sealed in the usual manner by packing 18. At the top of the stem a handle 19 is mounted for rotating the stem. Downward movement of the stem is limited by the boss 19a on the handle striking the packing nut 20. Upward movement of the valve stem is limited by the larger diameter of stem 16 abutting the lower face of the packing 18.

As the valve plug 14 moves from the open position of Fig. 1 to the closed position of Fig. 2, there occurs a period illustrated in Fig. 3 when the valve plug is nearly closed. At this time, the fluid rushes with great velocity through the annular space 21 between the upper edge of the plug 14 and the bore 13 of the valve housing. In order to prevent singing and chattering of the valve at this time, I rely upon two details of construction. In the first place, the lower end of stem 15 is flared outwardly, as shown at 15a, so that its outermost diameter approaches the peripheral diameter of the top of plug 14. My above mentioned copending application explains what these dimensions should be. I also find that it is desirable to produce a turbulence of the fluid flow through the space 21. To this end, in the form of my device shown in Figs. 1, 2 and 3, I have provided a very large number of fine scratches, score marks or very slight grooves 22 entirely around the upper periphery of the plug 14 on the outer wall thereof and extending generally in direction from top to bottom or generally parallel to the axis of the plug 14 and stem 15. While these score marks or scratches could extend farther down the plug, I find that they need only be provided around the upper edge thereof, which is the portion which comes close to the shoulder 13c as the valve plug moves close to a closed position. In other words, these score marks are upon one side of the narrow passageway 21 just as the valve is closing or opening.

In the modification of Fig. 4, the plug 23, shown in dot-dash lines, is of frusto-conical form but is not provided with the score marks 22 of the first described form. Instead, these score marks or tiny scratches or grooves are formed in the flaring wall 24 of the valve bore which takes the place of the flaring wall 13b of the first described form. These scratches or grooves 25 occur in great number and extend generally in the direction of fluid flow, that is, in the direction of the elements of the side walls of the truncated cone wall 24. Obviously, these scores or scratches 25 are in the zone where the high velocity fluid flow occurs just as the valve plug is closing or opening. Thus, these score marks or scratches will provide the turbulent flow in a manner similar to that provided by the score marks or scratches 22 on the valve plug in the form shown in Figs. 1 to 3.

In Fig. 5, I have shown another modification wherein the resilient valve plug 26 is of generally cylindrical form and seals against the gradually tapered wall 27 of the valve bore. The sides of this taper 27 extend roughly at an angle of 5 to 10 degrees to the vertical. It results from this construction that the upper edge of the cylindrical plug produces a line contact when it first engages the tapering walls 27 of the valve bore. Here the turbulence is provided at the zone where the closing takes place, by means of a very large number of scratches or score marks 28 on the valve body on the tapering portion 27 thereof and extending generally in the direction of fluid flow. These score marks might extend entirely along the tapered portion 27 but preferably they need only be provided in that zone where the upper edge of the plug 26 first approaches the tapering wall 27.

In Fig. 6, I have shown a modification which is in all respects similar to Fig. 2 except that the turbulence producing construction in this case consists in a pitting 29 which is produced around the upper outside wall of the resilient valve plug 30. The drawing is made to indicate a roughening of the rubber in this zone by sanding, abrasion, or any other suitable process.

Fig. 7 is quite analogous to Fig. 4. Here a frusto-conical resilient valve plug 31 fits into the generally cylindrical bore 32. The lower end of the bore is shown as slightly rounded at 32a and provided with a roughening 33 which will give a turbulence to the fluid flow as the valve plug approaches its sealed position. While the drawing has been dotted to indicate a roughening of the order of sand blasting, it will be recognized by those skilled in this art that the construction here shown might be provided by a sand casting having the rounded surface at 32a which is left in its original unfinished form. This will give sufficient roughness to provide the turbulence desired.

Fig. 8 is a modification of Fig. 7 in which the resilient sealing plug 34 is of generally cylindrical form and seals in the tapered portion of the bore indicated at 35. The taper here is similar to that previously described at 27 in Fig. 5. Here the roughening 36 in the nature of sand blasting is provided along a zone near the bottom of the taper 35 in a position analogous to the roughening scores 28 of Fig. 5. This again gives a turbulence in the zone where the upper edge of plug 34 first approaches the taper 35 in a sealing action.

In Fig. 9, I have shown a construction which is in all respects analogous to that described in Figs. 2 and 6. Here a resilient plug 37 of frusto-conical shape seals in a bore 38 in the valve housing. The lower end of the bore is flared as shown at 39 and a line contact occurs between the plug and the bore at the zone 40. The roughening of the plug in this case, provided for turbulence effect, consists of a spiral groove 41 formed in the rubber-like material of plug 37 in the outer wall thereof and near the top shoulder. This groove is somewhat enlarged in the drawing for clearness but it need not be of any very great depth. I have illustrated a groove extending about one turn of 360° around the top of plug 37. This provides turbulence as the upper edge of plug 37 approaches the sealing zone 40.

In Fig. 10, I have shown a modification of Fig. 9 wherein a plain frusto-conical plug of resilient rubber-like material 42 seals in the bore 43 of the valve housing, the sealing occurring in the nature of a line contact at the zone 44. Here the roughening structure for causing turbulence comprises a spiral groove or thread 45 cut in the flaring wall 46 at the bottom of the valve bore. For clearness, I have shown the ends of the single turn of spiral groove at 45a and 45b and I have indicated in dot-dash lines at 45c the position of the intermediate portion of the spiral groove on the near side of the flaring wall 46, which would not properly appear in this drawing as it occurs in the wall nearest the viewer.

In Fig. 11 I have shown a modification of Fig. 10 where a resilient plug of rubber-like material 47 is indicated in dot-dash lines as being of generally cylindrical character and sealing against the gradualy tapering wall 48 of the valve bore.

The taper of this wall is similar to that previously described at 27 and 35 in connection with other forms. Here the turbulence is produced by a helical groove 49 which is cut into the lower end of the flaring wall 48. The showing of this groove is similar to that described in more detail in connection with the groove 45 of Fig. 10. It will be obvious that this slight groove 49 occurs in that zone where the upper edge of plug 47 first approaches the tapering wall 48 for a sealing action. Thus turbulence occurs in the flow of the fluid in this zone as the valve approaches its closed position.

It will be noticed, in each case, that the actual line of sealing contact between plug and bore is between unroughened surfaces. The roughened surface is so placed on one part or the other as to be adjacent the narrow, annular opening (like 21) just before sealing takes place.

What I claim is:

1. A valve comprising a housing having a fluid inlet and a fluid outlet and a connecting passage there between, said passage having a cylindrical bore near its upstream end, a compressible resilient frusto-conical plug partially and wholly insertable in said bore, said plug having its base of smaller diameter downstream and slightly less in diameter than said bore, said plug having its base of larger diameter upstream and slightly greater in diameter than said bore, said plug forming an initial line contact at the zone where said plug first engages said bore, and a roughened surface on the side wall of said plug near said base of smaller diameter, said roughened surface being entirely downstream from said zone.

2. The combination of claim 1 wherein said roughened surface comprises fine score marks extending generally in the direction of stream flow.

3. The combination of claim 1 wherein said roughened surface comprises fine score marks extending generally at right angles to the direction of stream flow.

4. The combination of claim 1 wherein said roughened surface is finely pitted.

HENRY J. RAND.

References Cited in the file of this patent

UNITED STATES PATENTS

| Number | Name | Date |
| --- | --- | --- |
| 591,072 | Bourne | Oct. 5, 1897 |
| 1,415,407 | Schweinert | May 9, 1922 |
| 1,902,577 | Oakley | Mar. 21, 1933 |
| 2,148,850 | Deakins | Feb. 28, 1939 |
| 2,204,191 | Sloan | June 11, 1940 |
| 2,209,709 | Weatherhead | July 30, 1940 |
| 2,240,129 | Brodecker | Apr. 29, 1941 |
| 2,299,068 | Gora | Oct. 20, 1942 |
| 2,300,030 | Zinkil | Oct. 27, 1942 |
| 2,303,176 | Sloan | Nov. 24, 1942 |
| 2,341,394 | Sloan | Feb. 8, 1944 |